US005527363A

United States Patent [19]
Wilkinson et al.

[11] Patent Number: 5,527,363
[45] Date of Patent: Jun. 18, 1996

[54] METHOD OF FABRICATING AN EMBOSSED FLUID FLOW FIELD PLATE

[75] Inventors: David P. Wilkinson, North Vancouver; Gordon J. Lamont, Vancouver; Henry H. Voss, West Vancouver, all of Canada; Clemens Schwab, Friedrichshafen, Germany

[73] Assignees: Ballard Power Systems Inc., North Vancouver, Canada; Daimler-Benz AG, Stuttgart, Germany

[21] Appl. No.: 165,076

[22] Filed: Dec. 10, 1993

[51] Int. Cl.$^6$ ........................................ H01M 2/14
[52] U.S. Cl. .......................... 29/623.1; 264/293; 429/34
[58] Field of Search .................... 264/293; 428/156, 428/163; 429/34; 29/623.1

[56] References Cited

U.S. PATENT DOCUMENTS

| | | | |
|---|---|---|---|
| 3,755,000 | 8/1973 | Damange . | |
| 4,459,342 | 7/1984 | Shigeta et al. | 429/34 |
| 4,743,518 | 5/1988 | Romanowski | 429/34 |
| 4,769,297 | 9/1988 | Reiser et al. . | |
| 4,824,741 | 4/1989 | Kunz . | |
| 4,855,193 | 8/1989 | McElroy . | |
| 4,988,583 | 1/1991 | Watkins et al. | 429/30 X |
| 5,108,849 | 4/1992 | Watkins et al. . | |
| 5,176,966 | 1/1993 | Epp et al. . | |
| 5,230,966 | 7/1993 | Voss et al. | 429/34 X |
| 5,252,410 | 10/1993 | Wilkinson et al. . | |
| 5,284,718 | 2/1994 | Chow et al. . | |

FOREIGN PATENT DOCUMENTS

| | | |
|---|---|---|
| 61-7570 | 1/1986 | Japan . |
| 61-7571 | 1/1986 | Japan . |
| WO93/06627 | 4/1993 | WIPO . |
| WO94/11912 | 5/1994 | WIPO . |

OTHER PUBLICATIONS

Interim Report: "New Membrane–Catalyst For Solid Polymer Electrolyte Systems", P.O. N. 9–X53–D6272–1, Prepared for University of California, Los Alamos National Laboratory. *General Electrical Company*, 1984. Month not available.

Product Description: "GRAFOIL Flexible Graphite Quick Reference Grade Guide", *UCAR Carbon Company, Inc.*, 1991. Month not available.

*Primary Examiner*—Anthony Skapars
*Attorney, Agent, or Firm*—McAndrews, Held & Malloy, Ltd.

[57] ABSTRACT

An embossed fluid flow field plate for electrochemical cells comprises two sheets of compressible, electrically conductive material. Each sheet has two oppositely facing major surfaces. At least one of the major surfaces has an embossed surface which has a fluid inlet formed therein. The embossed surface has at least one open-faced channel embossed therein extending from the fluid inlet for conducting pressurized fluid introduced at the fluid inlet. A metal sheet is interposed between each of the compressible sheets. The compressible, electrically conductive sheet preferably comprises graphite foil. A method of fabricating an embossed separator plate for use in conjunction with an electrochemical fuel cell comprises (1) providing two sheets of compressible, electrically conductive sheet material, (2) interposing a metal sheet between each of the compressible sheets, and (3) embossing an open-faced channel in at least one of the surfaces of the sheets facing away from the metal sheet.

8 Claims, 9 Drawing Sheets

METHOD OF FABRICATING AN EMBOSSED FLUID FLOW FIELD PLATE

FIELD OF THE INVENTION

The present invention relates to electrochemical cells. More particularly, the present invention relates to the embossing of compressible, electrically conductive sheets for use as fluid flow field or separator plates for electrochemical cells, as well as the method of fabricating such embossed fluid flow field or separator plates. In addition, the present invention relates to embossed coolant flow field plates for electrochemical cells.

BACKGROUND OF THE INVENTION

Electrochemical fuel cells convert fuel and oxidant to electricity and reaction product. In electrochemical fuel cells employing hydrogen as the fuel and oxygen as the oxidant, the reaction product is water. Such fuel cells generally employ a membrane electrode assembly ("MEA") consisting of a solid polymer electrolyte or ion exchange membrane disposed between two electrodes formed of porous, electrically conductive sheet material, typically carbon fiber paper. The MEA contains a layer of catalyst, typically in the form of finely comminuted platinum, at each membrane/electrode interface to induce the desired electrochemical reaction. The electrodes are electrically coupled to provide a path for conducting electrons between the electrodes through an external load.

At the anode, the fuel permeates the porous electrode material and reacts at the catalyst layer to form cations, which migrate through the membrane to the cathode. At the cathode, the oxygen-containing gas supply reacts at the catalyst layer to form anions. The anions formed at the cathode react with the cations to complete the electrochemical reaction and form a reaction product.

In electrochemical fuel cells employing hydrogen as the fuel and oxygen-containing air (or substantially pure oxygen) as the oxidant, the catalyzed reaction at the anode produces hydrogen cations (protons) from the fuel supply. The ion exchange membrane facilitates the migration of hydrogen ions from the anode to the cathode. In addition to conducting hydrogen ions, the membrane isolates the hydrogen-containing fuel stream from the oxygen-containing oxidant stream. At the cathode, oxygen reacts at the catalyst layer to form anions. The anions formed at the cathode react with the hydrogen ions that have crossed the membrane to complete the electrochemical reaction and form liquid water as the reaction product.

In conventional fuel cells, the MEA is interposed between two fluid-impermeable, electrically conductive plates, commonly referred to as the anode and the cathode plates, respectively. The plates serve as current collectors, provide structural support for the porous, electrically conductive electrodes, provide means for carrying the fuel and oxidant to the anode and cathode, respectively, and provide means for removing water formed during operation of the fuel cell. When the channels are formed in the anode and cathode plates, the plates are normally referred to as fluid flow field plates. When the anode and cathode plates overlay channels formed in the anode and cathode porous material, the plates are normally referred to as separator plates.

Reactant feed manifolds are generally formed in the anode and cathode plates, as well as in the MEA, to direct the fuel (typically substantially pure hydrogen or hydrogen-containing reformate from the conversion of hydrocarbons such as methanol or natural gas) to the anode and the oxidant (typically substantially pure oxygen or oxygen-containing gas) to the cathode via the channels formed in either the fluid flow field plates or the electrodes themselves. Exhaust manifolds are also generally formed in the anode and cathode plates, as well as the MEA, to direct unreacted fuel and oxidant, as well as water accumulated at the cathode, from the fuel cell.

Multiple fuel cell assemblies comprising two or more anode plate/MEA/cathode plate combinations, referred to as a fuel cell stack, can be connected together in series (or in parallel) to increase the overall power output as required. In such stack arrangements, the cells are most often connected in series, wherein one side of a given fluid flow field or separator plate is the anode plate for one cell, the other side of the plate is the cathode plate for the adjacent cell, and so on.

Perfluorosulfonic ion exchange membranes, such as those sold by DuPont under its Nafion trade designation, have been used effectively in electrochemical fuel cells. Fuel cells employing Nafion-type cation exchange membranes require accumulated water to be removed from the cathode (oxidant) side, both as a result of the water transported across the membrane with cations and product water formed at the cathode from the electrochemical reaction of hydrogen cations with oxygen. An experimental perfluorosulfonic ion exchange membrane, sold by Dow under the trade designation XUS 13204.10, appears to have significantly less water transported with hydrogen cations across the membrane. Fuel cells employing the Dow experimental membrane thus tend to accumulate less water on the cathode (oxidant) side, as the accumulated water at the cathode is essentially limited to product water formed from the electrochemical reaction of hydrogen and oxygen.

A typical prior art fluid flow field plate, exemplified by General Electric Company and Hamilton Standard in a 1984 report for the U.S. Department of Energy (LANL No. 9-X53-D6272-1), included a plurality of parallel open-faced fluid flow channels formed in a major surface of a rigid, electrically conductive plate. The parallel channels extended between an inlet header and an outlet header formed in the plate. The parallel channels were typically rectangular in cross-section, and about 0.03 inches deep and about 0.03 inches wide. The inlet header was connected to an opening in the plate through which a pressurized reactant (fuel or oxidant) stream is supplied. The outlet header was connected to an opening in the plate through which the exhaust stream is discharged from the cell. In operation, the reactant stream ran from the inlet to the inlet header and then to the parallel channels from which reactant from the stream diffused through the porous electrode material to the electrocatalytically active region of the MEA. The stream then flowed to the outlet header and then to the outlet from which it was exhausted from the fuel cell.

Watkins U.S. Pat. Nos. 4,988,583 and 5,108,849 issued Jan. 29, 1991 and Apr. 28, 1992, respectively, describe fluid flow field plates which include a fluid supply opening and a fluid exhaust opening formed in the plate surface. Continuous open-faced fluid flow channels formed in the surface of the plate traverse the central area of the plate surface in a plurality of passes, that is, in a serpentine manner. Each channel has a fluid inlet at one end and a fluid outlet at the other end. The fluid inlet and outlet of each channel are directly connected to the fluid supply opening and fluid exhaust opening, respectively. The continuous channel design promotes the forced movement of water through each channel before the water can coalesce, thereby promoting uniform reactant flow across the surface of the cathode.

U.S. patent application Ser. No. 07/975,791, filed Nov. 13, 1992, now abandoned, incorporated by reference herein in its entirety, describes and claims a fluid flow field plate for electrochemical fuel cells in which the inlet and outlet flow channels are discontinuous. The employment of discontinuous flow channels, as described in U.S. patent application Ser. No. 07/975,791, now abandoned, has several advantages:

1. Improved performance, particularly at higher reactant inlet pressures, resulting from (a) more effective water removal due to better access of the reactant stream to the electrocatalytically active region at the membrane/electrode interface, (b) more uniform current density due to more even distribution of the reactant stream across the electrocatalytically active area of the fuel cell and the avoidance of water pooling in the flow channels, and (c) lower flow field plate/electrode contact resistance due to the use of a decreased amount of the flow field plate surface to accommodate the flow channels.

2. Improved fuel cell lifetime resulting from (a) the ability to reduce the compressive load on the electrodes due to decreased contact resistance between the flow field plates and the electrodes, and (b) more uniform reactant gas relative humidity due to more even distribution of the reactant stream across the electrocatalytically active area of the fuel cell.

3. Reduced manufacturing costs resulting from (a) the ability to reduce the amount of graphite plate milling required for continuous channels and to relax the tolerances required for the channel dimensions, (b) a wider range of materials and fabrication techniques permitted with the discontinuous flow channel design, such as stamping of flow field stencils, to be employed, particularly the use of thinner electrically conductive sheet materials, as the discontinuous channels do not require the thickness and rigidity of the electrically conductive plates in which continuous, serpentine flow channels are formed, and (c) the ability to employ a stenciled graphite foil laminate, thereby reducing the weight (and cost) associated with rigid graphite flow field plates.

Conventional methods of fabricating fluid flow field plates require the engraving or milling of flow channels into the surface of the rigid, resin-impregnated graphite plates. These methods of fabrication place significant restrictions on the minimum achievable cell thickness due to the machining process, plate permeability, and required mechanical properties. For example, the minimum practical thickness for a double-sided flow field plate is approximately 0.075 inches.

The conventional resin-impregnated graphite plates are expensive, both in raw material costs and in machining costs. The machining of channels and the like into the graphite plate surfaces causes significant tool wear and requires significant processing times.

As described and claimed in U.S. patent application Ser. No. 08/024,660 (the "'660 application") now U.S. Pat. No. 5,300,370, incorporated herein in its entirety, fluid flow field plates may also be fabricated by a lamination process. Specifically, the '660 application discloses and claims a laminated fluid flow field assembly for an electrochemical fuel cell which comprises:

a separator layer formed of electrically conductive, substantially fluid impermeable sheet material, the separator layer having two oppositely facing major surfaces;

a stencil layer formed of electrically conductive sheet material, the stencil layer having two oppositely facing major surfaces, the stencil layer having a fluid inlet formed therein and at least one opening formed therein extending between the major surfaces thereof, the at least one opening in fluid communication with the fluid inlet; and means for consolidating the separator layer and the stencil layer along one of their respective major surfaces.

In operation, the separator layer and the stencil layer cooperate to form at least one open-faced channel for conducting pressurized fluid introduced at the fluid inlet. The separator layer and the stencil layer are consolidated by compression, preferably in combination with an electrically conductive adhesive. The laminated fluid flow field assembly thus comprises two layers which must be properly positioned and aligned prior to consolidation.

It is often difficult and time consuming to properly position and align the separator and stencil layers of a laminated fluid flow field assembly. The two-layer laminated fluid flow field assembly also adds both volume and weight to the fuel cell, as compared, for example, to a one-layer fluid flow field assembly. Thus, as with conventionally fabricated fluid flow field plates, laminated fluid flow field assemblies restrict the extent to which cell thickness can be reduced because of the minimum thickness each plate or layer must possess to permit milling or engraving (in the case of graphite plates) or die-cutting (in the case of stencil layers or laminated assemblies).

Accordingly, it is an object of the present invention to provide an improved fluid flow field plate for use in electrochemical cells that is reduced in weight and volume, and that is simpler and less expensive to manufacture than conventional fluid flow field plates and laminated fluid flow field assemblies.

Another object of the present invention is to provide an improved fluid flow field plate for use in electrochemical cells that achieves a higher power density at a lower cost than conventional fluid flow field plates and laminated fluid flow field assemblies.

Still another object of the invention is to provide fluid flow field plates having improved sealing capabilities because of the presence of sealant grooves embossed in the surface of the plate.

A further object of the present invention is to provide improved coolant flow field plates for use in electrochemical cells.

A still further object of the invention is to provide an improved method of fabricating an embossed fluid flow field plate for use in electrochemical cells.

SUMMARY OF THE INVENTION

The above and other objects are achieved by an embossed fluid flow field plate for use in conjunction with an electrochemical cell. The plate comprises a sheet of compressible, electrically conductive material. The sheet has two oppositely facing major surfaces, at least one of the major surfaces comprising an embossed surface. The embossed surface has a fluid inlet formed therein and further has at least one open-faced inlet channel embossed therein. The at least one embossed inlet channel extends from the fluid inlet. In operation, the at least one embossed inlet channel conducts pressurized fluid introduced at the fluid inlet.

In the preferred embossed fluid flow field plate, the embossed surface has an inlet opening formed therein. The inlet opening extends between the major surfaces of the sheet and is in fluid communication with the fluid inlet. The embossed surface preferably has a fluid outlet formed therein, the embossed surface further having at least one open-faced outlet channel embossed therein, the at least one embossed outlet channel extending from the fluid outlet, whereby the at least one embossed outlet channel conducts pressurized fluid to the fluid outlet.

In one preferred embodiment, the at least embossed inlet channel extends into the at least one embossed outlet channel to form at least one embossed continuous channel, whereby pressurized fluid introduced at the fluid inlet is conducted to the fluid outlet along the at least one inlet channel and the at least one outlet channel. In this embodiment, the at least one embossed continuous channel forms a serpentine pattern on the embossed surface.

In another preferred embodiment, the at least one embossed inlet channel is discontinuous with respect to the at least one embossed outlet channel. In this embodiment, the at least one embossed outlet channel preferably comprises at least two embossed outlet channels, and the at least one embossed inlet channel and the at least two embossed outlet channels are preferably interdigitated, whereby each adjacent pair of embossed outlet channels has an embossed inlet channel disposed therebetween along a substantial portion thereof.

In the preferred embossed fluid flow field plate, the compressible, electrically conductive sheet preferably comprises graphite foil. In another preferred embodiment, the compressible, electrically conductive sheet is a laminated assembly comprising at least two layers of graphite foil and a metal foil layer interposed between each adjacent pair of graphite foil layers.

In still another preferred embodiment, the embossed surface further has at least one open-faced sealant channel embossed therein. The at least one embossed sealant channel circumscribes the central portion of the embossed surface and accommodates a substantially fluid impermeable sealant material therein, whereby the sealant material fluidly isolates the central portion from the atmosphere surrounding the plate.

The above and other objects are also achieved by an electrochemical fuel cell for converting a fluid fuel stream and a fluid oxidant stream to a reaction product stream and electrical energy. The fuel cell comprises:

first and second embossed fluid flow field plates, each of the plates comprising:
a separator sheet formed of compressible, electrically conductive material, the separator sheet having two oppositely facing major surfaces, at least one of the major surfaces comprising an embossed surface, the embossed surface having a fluid inlet formed therein and further having at least one open-faced inlet channel embossed therein, the at least one embossed inlet channel extending from the fluid inlet, whereby the at least one embossed inlet channel conducts pressurized fluid introduced at the fluid inlet;

a membrane electrode assembly interposed between the first and second embossed fluid flow field plates, the membrane electrode assembly comprising:
an anode having a catalyst associated therewith to render a region of the anode electrocatalytically active wherein cations are produced from the fluid fuel stream;
a cathode having a catalyst associated therewith to render a region of the cathode electrocatalytically active wherein an electrochemical reaction between the cations and the fluid oxidant stream is promoted;
a solid polymer ion exchange membrane disposed between the anode assembly and the cathode assembly, the membrane facilitating the migration of cations from the anode assembly to the cathode assembly and isolating the fluid fuel stream from the fluid oxidant stream;
an electrical path for conducting electrons formed at the anode assembly to the cathode assembly.

The preferred fuel cell further comprises a coolant flow field plate adjacent one of the separator sheets on the side facing away from the membrane. The coolant flow field plate comprises:
a sheet of compressible, electrically conductive, substantially fluid impermeable material, the sheet having two oppositely facing major surfaces, at least one of the major surfaces comprising an embossed surface, the embossed surface having at least one open-faced sealant channel embossed therein, the at least one embossed sealant channel circumscribing the central portion of the embossed surface and accommodating a substantially fluid impermeable sealant material therein, whereby the sealant material fluidly isolates the central portion from the atmosphere surrounding the plate, the embossed surface further having a coolant inlet, a coolant outlet, and at least one open-faced coolant channel formed therein, whereby the at least one coolant channel conducts pressurized fluid introduced at the coolant inlet toward the coolant outlet.

In the preferred fuel cell, the major surface of the coolant flow field plate facing away from the membrane forms a cooling fluid flow field plate of an adjacent fuel cell. In the preferred fuel cell, the compressible, electrically conductive sheet comprises graphite foil.

The above and other objects are further achieved by an embossed coolant flow field plate for use in conjunction with an electrochemical cell. The plate comprises:
a sheet of compressible, electrically conductive, substantially fluid impermeable material, the sheet having two oppositely facing major surfaces, at least one of the major surfaces comprising an embossed surface, the embossed surface having at least one open-faced sealant channel embossed therein, the at least one embossed sealant channel circumscribing the central portion of the embossed surface and accommodating a substantially fluid impermeable sealant material therein, whereby the sealant material fluidly isolates the central portion from the atmosphere surrounding the plate, the embossed surface further having a coolant inlet, a coolant outlet, and at least one open-faced coolant channel formed therein, whereby the at least one coolant channel conducts pressurized fluid introduced at the coolant inlet toward the coolant outlet.

In the preferred embossed coolant flow field plate, the at least one coolant channel is embossed in the embossed surface. The at least one coolant channel can also be milled or die-cut in the embossed surface. In the preferred embossed coolant flow field plate, the compressible, electrically conductive sheet comprises graphite foil.

The above and other objects are still further achieved by an embossed separator plate for use in conjunction with an electrochemical cell. The plate comprises:
a sheet of compressible, electrically conductive material, the sheet having two oppositely facing major surfaces, at least one of the major surfaces comprising an embossed surface, the embossed surface having at least one open-faced sealant channel embossed therein, the at least one embossed sealant channel circumscribing the central portion of the embossed surface and accommodating a substantially fluid impermeable sealant material therein, whereby the sealant material fluidly isolates the central portion from the atmosphere surrounding the plate.

In the preferred separator plate, the embossed surface has a fluid inlet formed therein and at least one open-faced inlet channel formed therein. The at least one inlet channel extends from the fluid inlet, whereby the at least one inlet channel conducts pressurized fluid introduced at the fluid inlet. The embossed surface preferably has a fluid outlet formed therein, and further has at least one open-faced outlet channel formed therein. The at least one outlet channel extends from the fluid outlet, whereby the at least one outlet channel conducts pressurized fluid to the fluid outlet. The inlet channel and the outlet channel are most preferably embossed in the embossed surface. The inlet channel and the outlet channel can also be milled or die-cut in the embossed surface.

As in the preferred embossed fluid flow field plate, the inlet and outlet channels can be continuous, preferably arranged in a serpentine pattern on the embossed surface, or discontinuous, preferably arranged in an interdigitated pattern on the embossed surface.

In the preferred separator plate, the compressible, electrically conductive sheet comprises graphite foil. In another preferred embodiment, the compressible, electrically conductive sheet is a laminated assembly comprising at least two layers of graphite foil and a metal foil layer interposed between each adjacent pair of graphite foil layers.

The above and other objects are yet further achieved by an embossed separator plate for use in conjunction with an electrochemical cell. The plate comprises:

a sheet of compressible, electrically conductive material, the sheet having two oppositely facing major surfaces and at least one manifold opening formed therein between the major surfaces, at least one of the major surfaces comprising an embossed surface, the embossed surface having at least one open-faced sealant channel embossed therein, the at least one embossed sealant channel circumscribing the at least one manifold opening and accommodating a substantially fluid impermeable sealant material therein, whereby the sealant material fluidly isolates the at least one manifold opening from the atmosphere surrounding the plate.

The above and other objects are also achieved by a method of fabricating an embossed separator plate for use in conjunction with an electrochemical cell. The method comprises:

providing a sheet of compressible, electrically conductive sheet material, the sheet having two oppositely facing major surfaces;

embossing at least one open-faced channel in at least one of the major surfaces.

The preferred method further comprises:

forming a fluid inlet on at least one of the major surfaces such that the at least one channel extends from the fluid inlet, whereby the at least one channel conducts pressurized fluid introduced at the fluid inlet.

In the preferred method, the at least one embossed channel circumscribes the central portion of the at least one major surface and accommodates a substantially fluid impermeable sealant material in the at least one embossed channel, whereby the sealant material fluidly isolates the central portion from the atmosphere surrounding the plate. The most preferred method further comprises:

forming a fluid inlet on at least one of the major surfaces;

forming at least one open-faced channel in the at least one of the major surfaces, the at least one channel extending from the fluid inlet, whereby the at least one channel conducts pressurized fluid introduced at the fluid inlet.

The at least one channel is preferably embossed in the at least one major surface. The at least one channel can also be milled or die-cut in the at least one major surface. In the preferred method, the compressible, electrically conductive sheet comprises graphite foil.

BRIEF DESCRIPTION OF THE DRAWINGS

FIG. 4b is a top plan view of the other major surface of the embossed fluid flow field plate illustrated in FIG. 4a.

FIG. 5b is a top plan view of the other major surface of the embossed separator plate illustrated in FIG. 5a.

FIG. 7b is a top plan view of the other major surface of the coolant flow field plate illustrated in FIG. 7a.

DETAILED DESCRIPTION OF THE PREFERRED EMBODIMENTS

Figure 1:
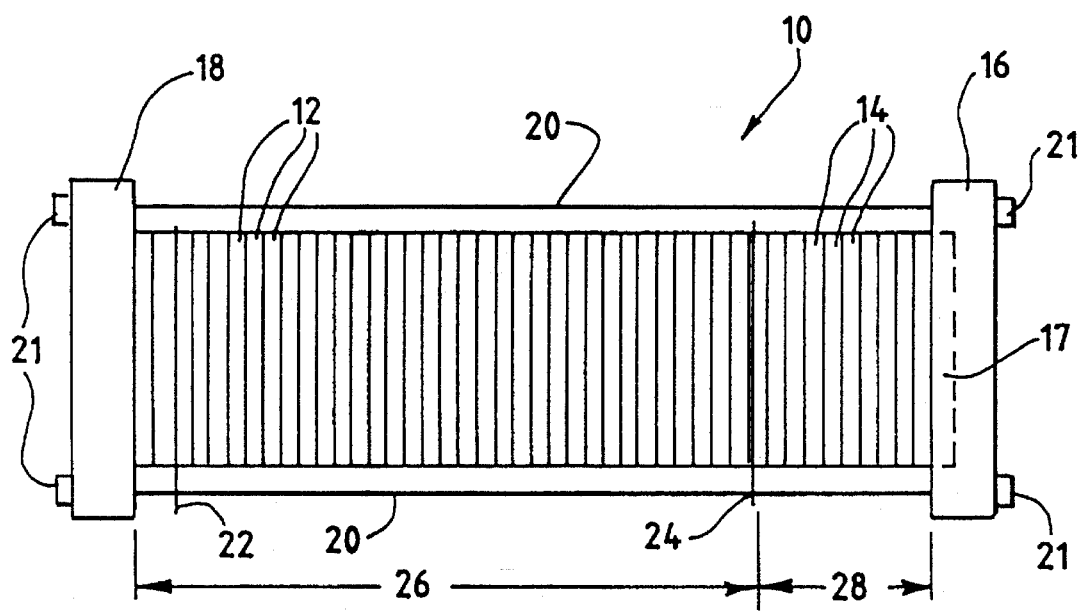
FIG. 1 is a side elevation view of a fuel cell stack showing the electrochemically active and humidification sections.

Turning first to FIG. 1, a fuel cell stack assembly 10 includes an electrochemically active section 26 and optionally includes a humidification section 28. Stack assembly 10 is a modular plate and frame design, and includes a compression end plate 16 and a fluid end plate 18. An optional pneumatic piston 17, positioned within compression end plate 16, applies uniform pressure to the assembly to promote sealing. Bus plates 22 and 24 located on opposite ends of active section 26 provide the negative and positive contacts, respectively, for the electrical path conducting current generated by the assembly to an external electrical load (not shown). Tie rods 20 extend between end plates 16 and 18 to retain and secure stack assembly 10 in its assembled and consolidated state with fastening nuts 21.

Active section 26 includes, in addition to bus plates 22 and 24, a plurality of fuel cell repeating units 12. Each repeating unit 12 consists of a membrane electrode assembly, an anode fluid flow field plate, a cathode fluid flow field plate (or alternatively anode and cathode separator layers if the anode and cathode reactant flow channels are formed in the surfaces of the electrode material) and optionally a coolant jacket, as described in more detail below. In the assembly illustrated in FIG. 1, the repeating units 12 are electrically coupled in series by virtue of the contact between the electrically conductive layers which form the flow field plates (or the separator layers) and the coolant jackets.

Optional humidification section 28 includes a plurality of humidification assemblies 14, each assembly 14 consisting of fuel or oxidant reactant flow field plate, a water flow field plate, and a water transport membrane interposed between the reactant flow field plate and the water flow field plate. When present, humidification section 28 imparts water to the fuel and oxidant streams fed to active section 26, thereby preventing the membranes within the active section from drying out.

Figure 2:
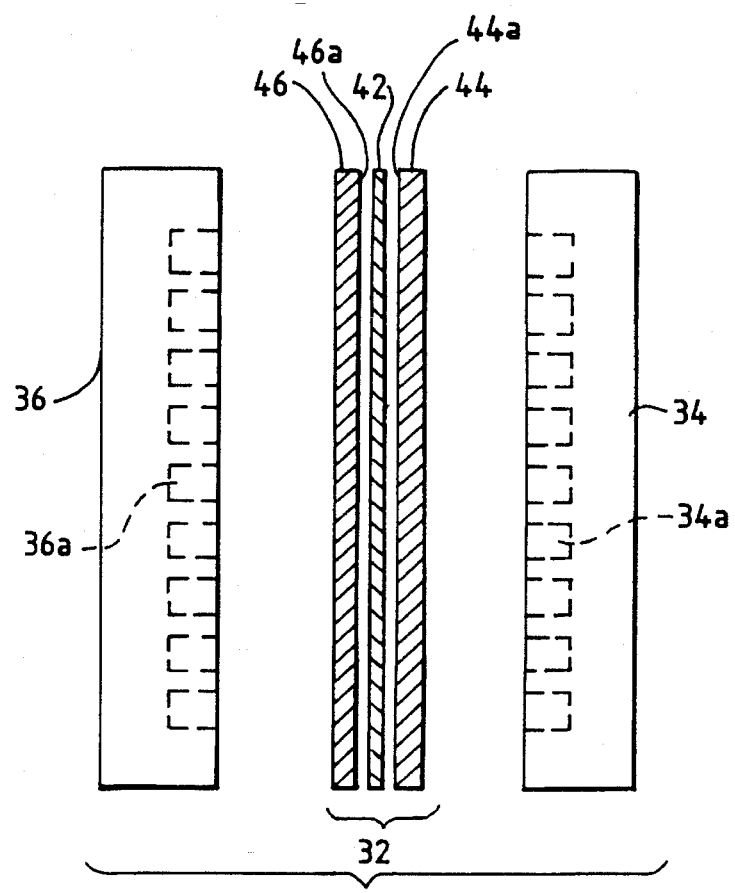
FIG. 2 is an exploded side view of a fuel cell including a membrane electrode assembly interposed between two conventional fluid flow field plates having reactant flow channels formed in the major surfaces facing the electrodes.

FIG. 2 illustrates a conventional fuel cell 30, which includes a membrane electrode assembly 32 interposed between rigid flow field plates 34 and 36. Membrane electrode assembly 32 consists of an ion exchange membrane 42 interposed between two electrodes, namely, anode 44 and cathode 46. Anode 44 and cathode 46 are typically formed of porous electrically conductive sheet material, preferably carbon fiber paper, and have planar major surfaces 44a and 46a, respectively. Electrodes 44 and 46 have a thin layer of catalyst material disposed on their major surfaces 44a and 46a, respectively, at the interface with membrane 42 to render them electrochemically active.

As shown in FIG. 2, anode flow field plate 34 has at least one open faced channel 34a engraved, milled or molded in its surface facing membrane 42. Similarly, cathode flow field plate 36 has at least one open faced channel 36a engraved, milled or molded in its major surface facing membrane 42. When assembled against the cooperating major surfaces of electrodes 44 and 46, channels 34a and 36a form the reactant flow field passages for the fuel and oxidant, respectively.

Figure 3:
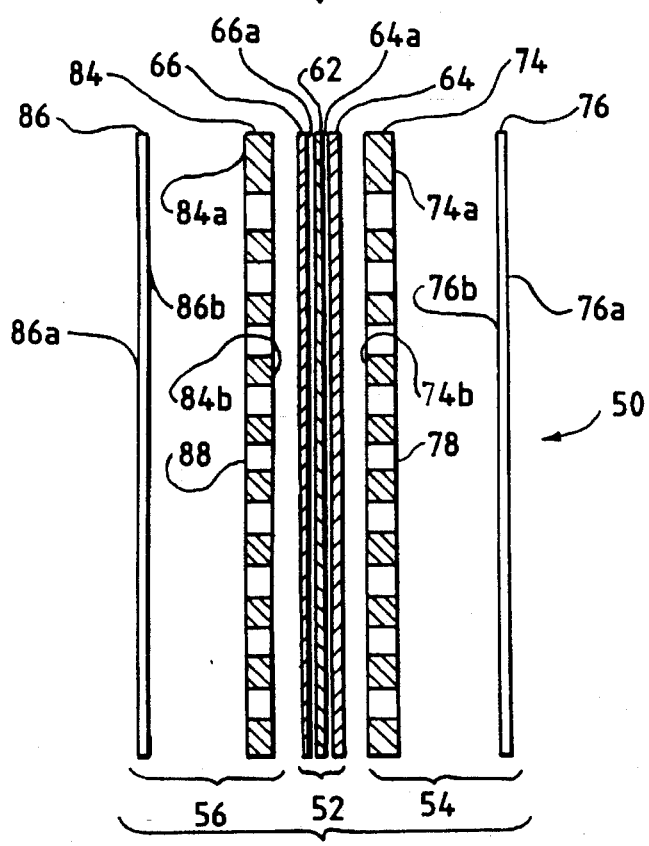
FIG. 3 is an exploded side sectional view of a fuel cell including a membrane electrode assembly interposed between two laminated fluid flow field assemblies, one layer of which is a stencil layer having openings formed therein and the other layer of which is a separator layer.

FIG. 3 illustrates a fuel cell 50 including a membrane electrode assembly 52 interposed between two laminated fluid flow field assemblies 54 and 56. As in the membrane electrode assembly 32 of FIG. 2, membrane electrode assembly 52 consists of an ion exchange membrane 62 interposed between two electrodes, namely, anode 64 and cathode 66. Anode 64 and cathode 66 are also typically formed of porous electrically conductive sheet material, preferably carbon fiber paper, and have planar major surfaces 64a and 66a, respectively. Electrodes 64 and 66 have a thin layer of catalyst material disposed on their major surfaces 64a and 66a, respectively, at the interface with membrane 62 to render them electrochemically active.

As shown in FIG. 3, anode fluid flow field plate 54 is a laminated assembly of stencil layer 74 and separator layer 76. Similarly, cathode fluid flow field plate 56 is a laminated assembly of stencil layer 84 and separator layer 86.

Figure 4A:
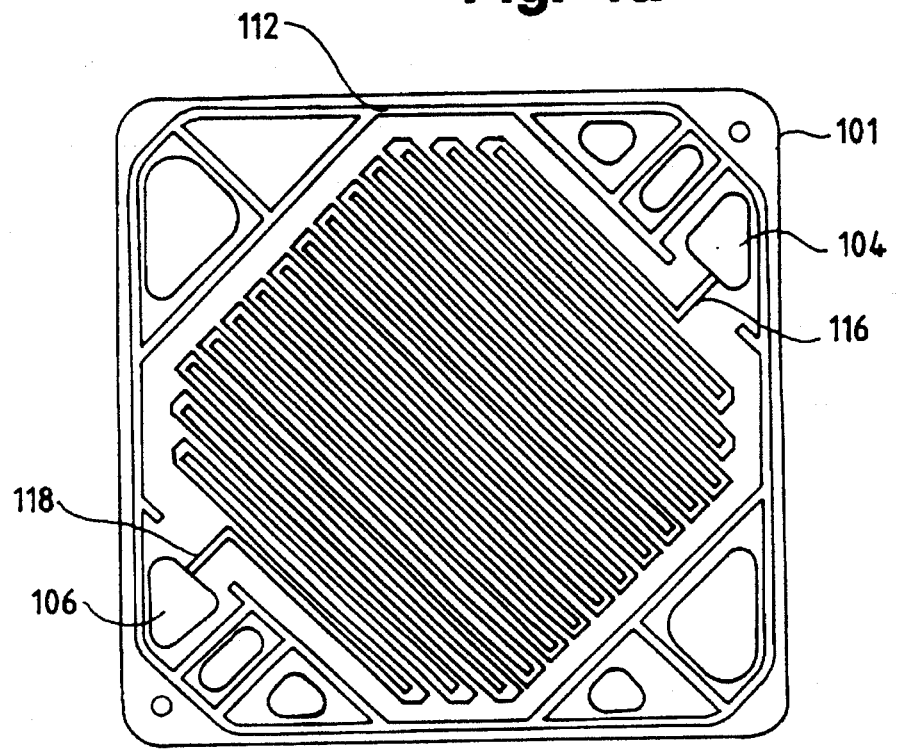
FIG. 4a is a top plan view of one major surface of an embossed fluid flow field plate in accordance with the present invention.

FIG. 4a shows one major surface of an embossed reactant fluid flow field plate 100 in accordance with the present invention. Plate 100 is preferably formed from compressible, electrically conductive graphite foil sheet material commercially available under the trade designation "GRAFOIL" from UCAR Carbon Company, Inc. of Cleveland, Ohio. GRAFOIL sheets are available in standard thicknesses (1/32 inch, 1/16 inch and 1/8 inch, for example), but other thicknesses of graphite foil sheets can be employed as well. The most preferred form of GRAFOIL for use in fabricating the embossed fluid flow field plates of the present invention is UCAR's grade "GH-A" gasket laminate, and the most preferred thickness is approximately 0.064 inches.

Other suitable electrically conductive materials, sufficiently soft so as to permit embossing, could be used to fabricate the embossed fluid flow field plates described and claimed herein. Such other materials include porous, electrically conductive sheet materials, such as carbon fiber paper, as well as corrosion resistant metals such as niobium, somewhat corrosive resistant materials such as magnesium or copper, particularly when plated with noble metals such as gold or platinum to render them unreactive, and composite materials composed of a corrosive resistant metal powder, a base metal powder plated with the corrosive resistant metal, and/or other chemically inert electrically conductive powders, such as graphite and boron carbide, bonded together with a suitable binder to produce a compressible, electrically conductive sheet material.

Figure 4B:
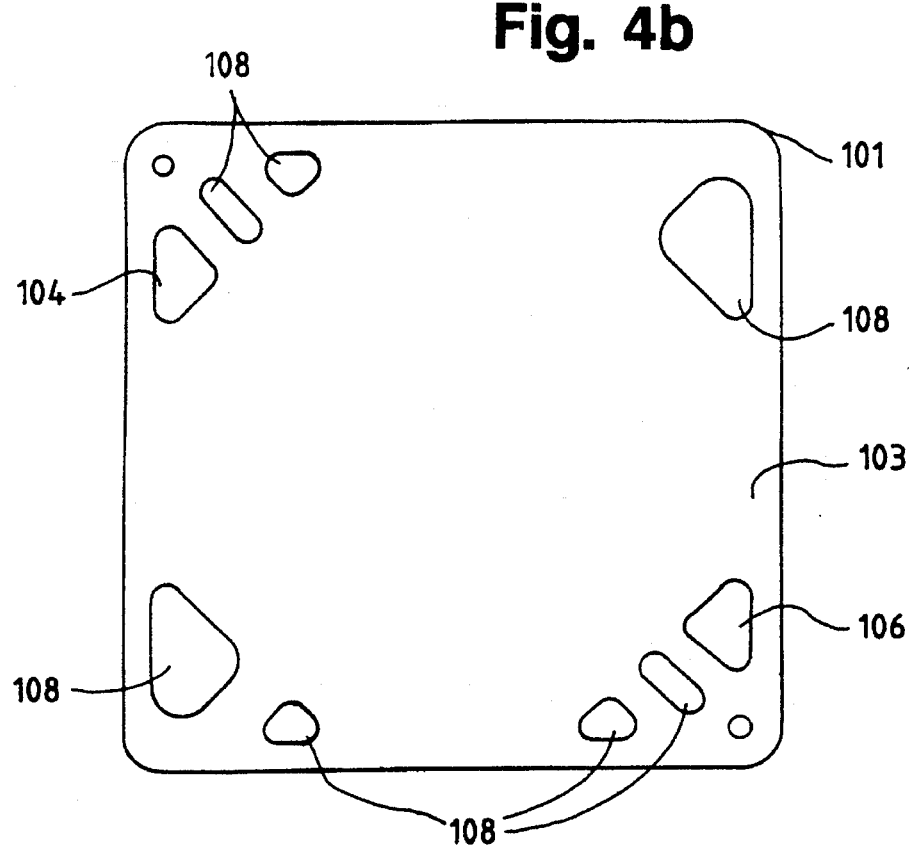

As shown in FIG. 4a, a sheet 101, formed of compressible, electrically conductive material, preferably graphite foil, has a major surface 102. Fluid inlet opening 104 and fluid outlet opening 106 are die-cut and extend between the major surface 102 and its oppositely facing major surface 103 shown in FIG. 4b. Other manifold openings 108 are also die-cut and extend between the oppositely facing major surfaces of sheet 101.

Major surface 102 of plate 100 has embossed therein a reactant fluid flow field 110 comprising a pair of continuous fluid flow field channels 114, as well as a sealant channel 112. Each flow field channel 114 has a fluid inlet 116 at one end and a fluid outlet 118 at the other end. Fluid inlet 116 is directly connected to fluid inlet opening 104. Similarly, fluid outlet 118 is directly connected to a fluid outlet opening 106. Fluid inlet opening 104 is connected to a source of fuel (not shown) in the case of the anode flow field plate or a source of oxidant (not shown) in the case of the cathode 10 flow field plate. Channel 114 traverses the major central area of major surface 102, in a plurality of passes (two passes in the embodiment illustrated in FIG. 4a), which in turn generally corresponds to the electrocatalytically active region of the anode or cathode, which is adjacent when the cell is assembled. Openings 108 serve as manifolds for the various fluid reactant and coolant streams within the cell.

Fluid flow field channels 114 are preferably embossed in sheet 101 using a die, such as a graphite plate, which has the reverse image of the desired flow field and sealing groove. Channels 114 are generally U-shaped or V-shaped in cross-section, the V-shaped channels facilitating die release in certain embossing applications. The graphite foil sheet is embossed at an embossing pressure sufficient to impart, into the compressible sheet material, smooth-surfaced channels, of substantially uniform depth, and having a clean, reverse image of the embossing die. Different flow field patterns and plate sizes will require different embossing pressures. The bulk of the sheet material (that is, the portions of the sheet material located apart from the channels) can also be compressed during the embossing operation. In this regard, the embossing pressure can be selected to provide the appropriate channel depth and cross-sectional profile, and also to impart the appropriate electrical conductivity and porosity to the bulk material.

Figure 5A:
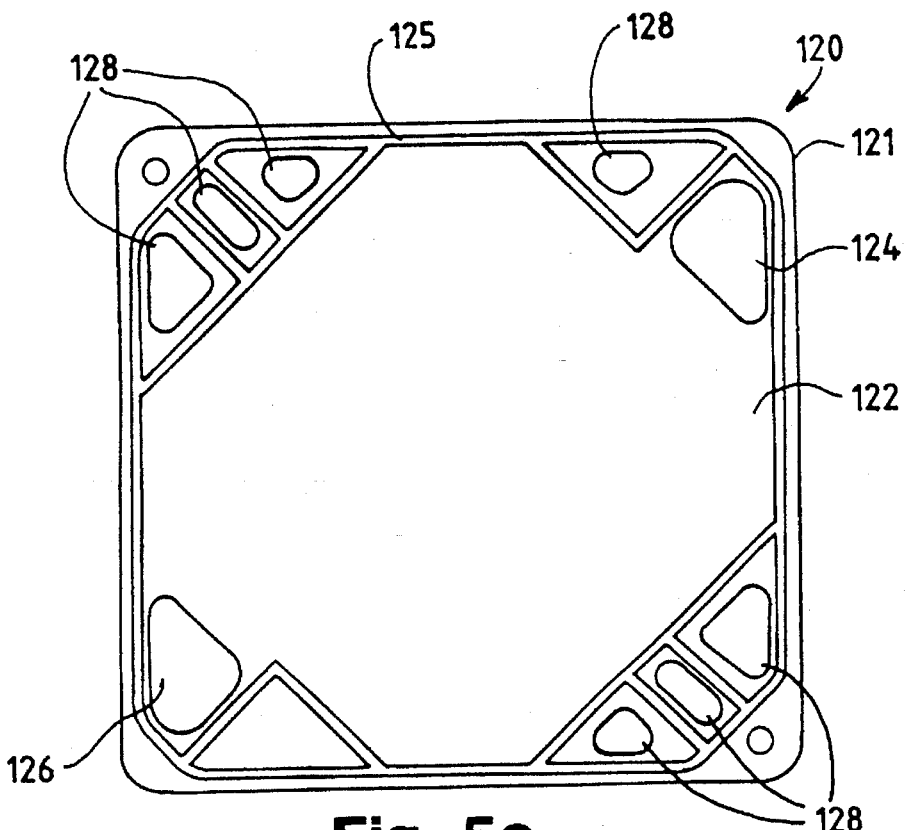
FIG. 5a is a top plan view of one major surface of an embossed separator plate in accordance with the present invention.

FIG. 5a shows one major surface of an embossed separator plate 120 in accordance with the present invention. Plate 120 is preferably comprises compressible, electrically conductive sheet material, preferably graphite foil. Sheet 121 has a major surface 122. Fluid inlet opening 124 and fluid outlet opening 126 are die-cut and extend between the major surface 122 and its oppositely facing major surface 123 shown in FIG. 5b. Other manifold openings 128 are also die-cut and extend between the oppositely facing major surfaces of plate 121.

Major surface 122 of sheet 121 has embossed therein an open-faced sealant channel 125. Fluid inlet opening 124 is connected to a source of fuel (not shown) in the case of the anode flow field plate or a source of oxidant (not shown) in the case of the cathode flow field plate. Pressurized reactant fluid introduced at the inlet opening 124 is directed to the central electrocatalytically active region of the anode or cathode, which is adjacent when the cell is assembled, via channels formed in the adjacent anode or cathode or via the interstitial spaces within the porous sheet material from which the adjacent anode or cathode is preferably formed. Openings 128 serve as manifolds for the various fluid reactant and coolant streams within the cell.

Figure 5B:
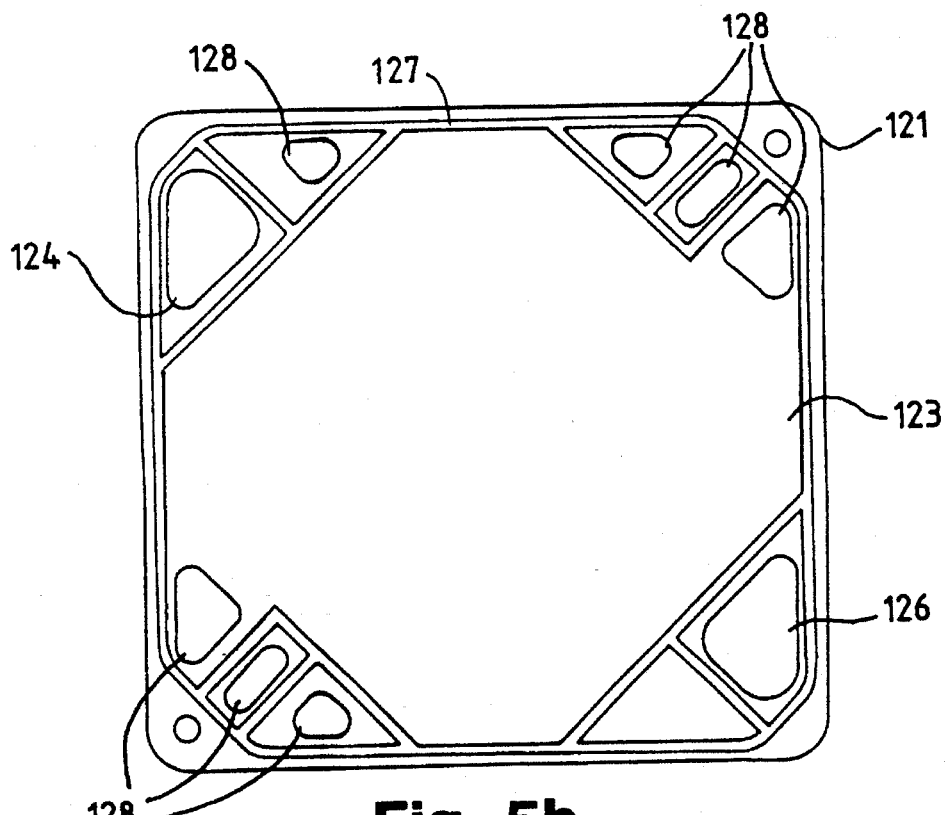

Sealant channel 125 is preferably embossed in sheet 121 using a die, in a manner similar to which the sealant channel 112 and the reactant fluid flow field channel 114 are embossed in sheet 101 illustrated in FIG. 4a. As shown in FIG. 5a, sealant channel 125 circumscribes the central portion of surface 122, as well as openings 128. Sealant channel 125 accommodates a substantially fluid impermeable sealant material (not shown) disposed in channel 125. In operation, the sealant material fluidly isolates the central portion of surface 122 from the atmosphere surrounding plate 120. As shown in FIG. 5b, sealant channel 127 in surface 123 is structurally and functionally identical to channel 125 in surface 122.

The separator plate 120 illustrated in FIGS. 5a and 5b has no reactant fluid flow field channels embossed, milled, die-cut or otherwise formed therein. It will be understood, however, that such channels could be formed in either or both of the major surfaces 122, 123 of sheet 121 to provide a fluid flow field plate similar to that illustrated in FIGS. 4a and 4b.

Figure 6:
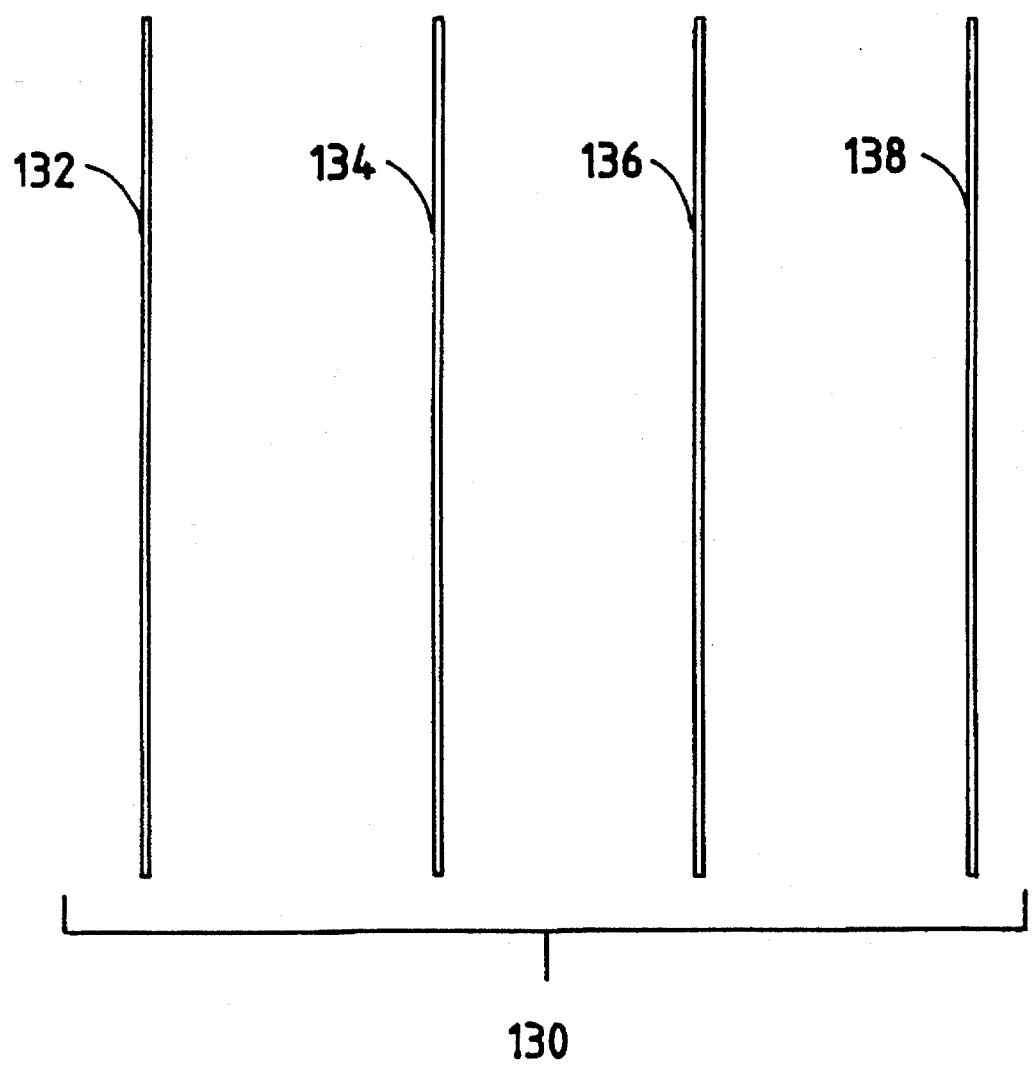
FIG. 6 is a side view of a fuel cell incorporating an embossed fluid flow field plate in accordance with the present invention.

FIG. 6 shows an exploded side view of a fuel cell repeating unit, such as repeating unit 12 in FIG. 1, employing embossed reactant and coolant flow field plates. As shown in FIG. 6, a unit cell repeating unit 130 is made up of an embossed cathode (oxidant) fluid flow field or separator plate 132, a membrane electrode assembly (MEA) 134, an anode (fuel) fluid flow field or separator plate 136, and a coolant flow field plate or water jacket 138.

The embossed reactant (fuel and oxidant) and coolant flow field plates 132, 136, 138 of the fuel cell repeating unit 130 of FIG. 6 are preferably formed from graphite foil sheets. The unit cell has a thickness of approximately 0.200 inches and a unit cell weight of approximately 218 grams. Reduced cell weight and volume are achieved with these graphite foil sheets, which are considerably thinner and lighter than conventional milled graphite fluid flow field plates. The embossed fluid flow field plates thus drastically reduce the weight and volume of the fuel cell stack.

Figure 7A:
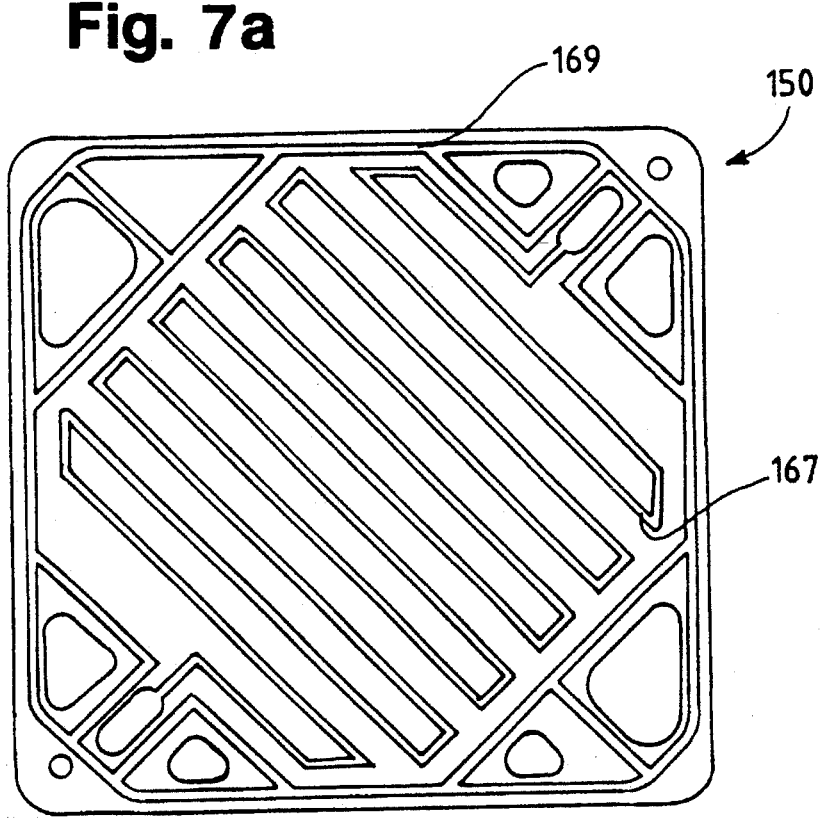
FIG. 7a is a top plan view of one major surface of a coolant flow field plate in accordance with the present invention.
Figure 7B:
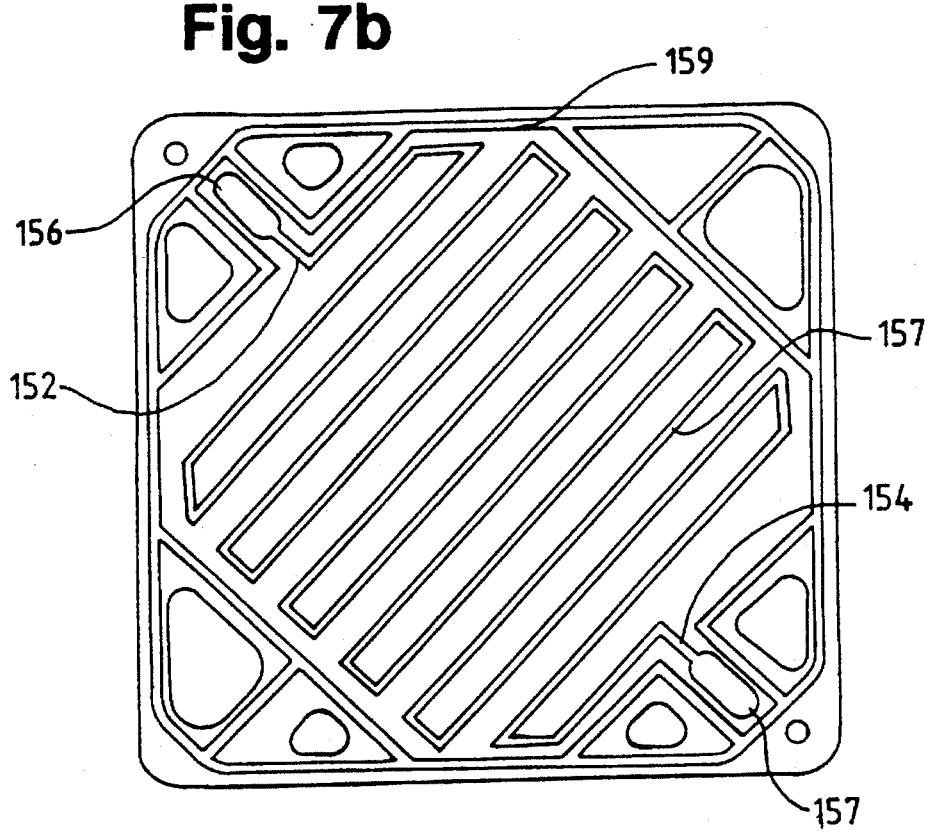

Although embossed coolant flow field plates may be employed as described above, die-cut coolant flow channels and embossed sealant channels can also be formed in the coolant flow field plates. FIGS. 7a and 7b are views, respectively, of a double-sided coolant flow field plate 150 having die-cut coolant flow channels 157, 167 and embossed sealant channels 159, 169 formed therein. Die-cut coolant flow channels 157, 167 extend between the major surfaces of plate 150. Plate 150 preferably comprises compressible, electrically conductive sheet material, most preferably graphite foil. Channel 157 has associated therewith a coolant inlet 152 and a coolant outlet 154. A coolant inlet 152 is in fluid communication with the coolant inlet manifold opening 156. The coolant outlet 154 is in fluid communication with the coolant outlet manifold opening 157. In operation, the coolant flow field plate is assembled and sealed against a fluid flow field plate or separator plate of the adjacent MEAs. Each adjacent fluid flow field plate or separator plate cooperates with channels 157, 167 to form a four-sided passage for containing and directing coolant fluid within channels 157, 167. Using the double-sided design, a single coolant flow field plate can conduct coolant fluid on each of its major surfaces, and simultaneously cool the anode and cathode of neighboring MEAs.

The fluid flow field in the embossed plates described herein may comprise a single or a plurality of continuous or discontinuous reactant flow channels die-cut or embossed therein. Conventional fluid flow field plates having continuous, serpentine channels are described and illustrated in Watkins U.S. Pat. Nos. 4,988,583 and 5,108,849. Fluid flow field plates having discontinuous, interdigitated channels are described and illustrated in U.S. patent application Ser. No. 07/975,791 now abandoned. While the present embossed fluid flow field plates are particularly suited to the discontinuous, interdigitated flow channels described in U.S. patent application Ser. No. 07/975,791, now abandoned, the embossed configuration can also be employed in conjunction with continuous, serpentine flow channel configurations, such as those described in Watkins U.S. Pat. Nos. 4,988,583 and 5,108,849.

The embossed fluid flow field plates described and illustrated herein contain fluid manifolds. It will be understood, however, that other means for introducing fluids to and discharging fluids from the surface of the assemblies are possible. For example, external manifolds may be preferred in some instances to introduce fluids through an inlet (or inlets) located along an edge (or edges) of the embossed fluid flow field plates and to discharge fluids from the surface of the plates through an outlet (or outlets) located along another edge (or edges) of the plates. The embossed fluid flow field described and claimed herein extend to fuel cells employing such other external manifold designs.

Figure 8:
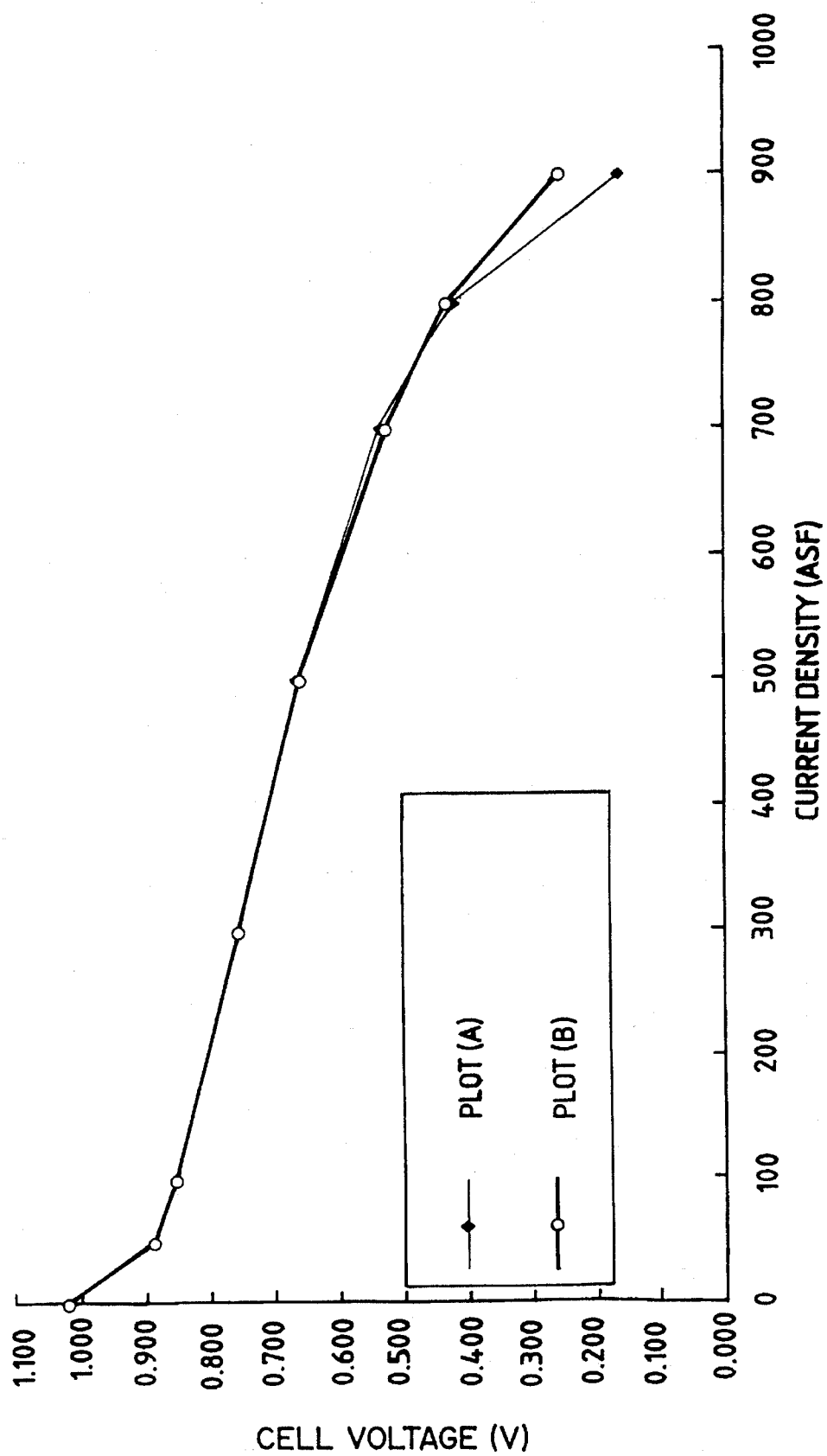
FIG. 8 is a plot of cell voltage as a function of current density for two fuel cells (designated "A" and "B"). Plot A shows the performance of a fuel cell employing conventional fluid flow field plates formed of solid graphite, such as that illustrated in FIG. 2. Plot B shows the performance of a fuel cell employing embossed fluid flow field plates, such as those illustrated in FIGS. 4a and 4b.

The performance of electrochemical fuel cells incorporating embossed fluid flow field compares favorably to the performance of conventional fuel cells employing milled graphite fluid flow field plates. FIG. 8 is a plot of cell voltage as a function of current density for two fuel cells (designated "A" and "B") at 30/30 psig (air/$H_2$). In each of plots A and B, a milled graphite anode flow field plate was employed, along with the following operating conditions: 2.0/1.5 air/$H_2$ stoichiometry, temperature =75° C., DuPont Nafion 117 cation exchange membrane. In Plot A, a 10-pass, conventional milled graphite cathode flow field plate was employed, such as that illustrated in FIG. 2. In Plot B, a 7-pass, embossed graphite foil cathode flow field plate was employed, such as that illustrated in FIG. 4. FIG. 8 shows that the performance of a fuel cell employing an embossed reactant fluid flow field plate compares favorably, and was superior at high current density, to the performance of a fuel cell employing conventional, milled graphite fluid flow field plates.

Figure 9:
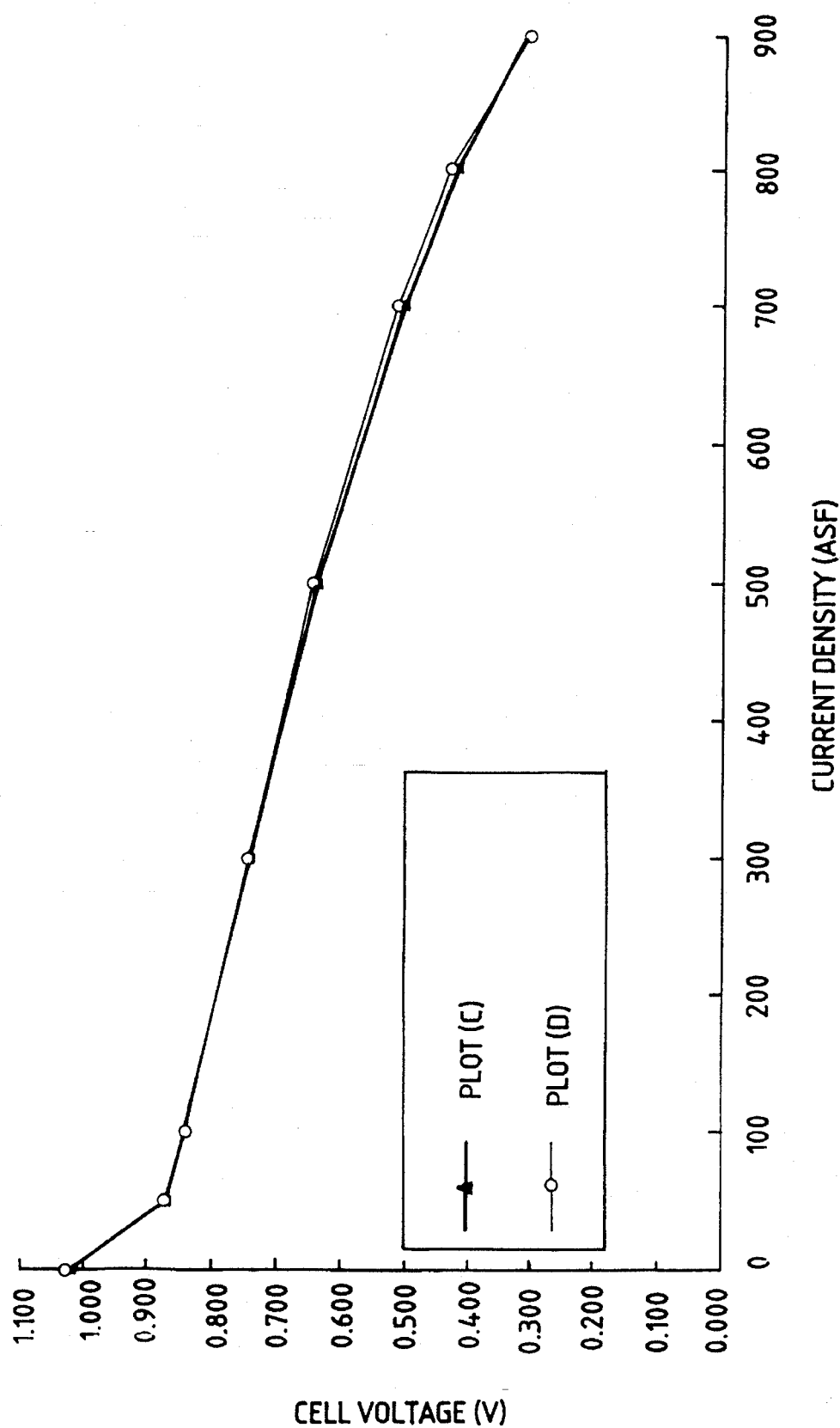
FIG. 9 is a plot of cell voltage as a function of current density for two fuel cells (designated "C" and "D") at 30/30 psig (air/$H_2$). Plot C shows the performance of a fuel cell employing an embossed coolant flow field plate. Plot D shows the performance of a fuel cell employing a conventional coolant flow field plate formed of solid graphite.

Similarly, the performance of a fuel cell employing embossed coolant flow field plates compares favorably to the performance of a conventional fuel cell employing milled graphite coolant flow field plates. FIG. 9 is a plot of cell voltage as a function of current density for two fuel cells (designated "C" and "D") at 30/30 psig (air/$H_2$). In each of plots C and D, a milled graphite anode flow field plate and a milled graphite cathode flow field plate were employed, along with the following operating conditions: 2.0/1.5 air/$H_2$ stoichiometry, temperature =75° C., DuPont Nafion 117 cation exchange membrane. Plot C shows the performance of a fuel cell employing embossed coolant flow field plates. Plot D shows the performance of a fuel cell employing conventional, milled graphite coolant flow field plates.

Figure 10:
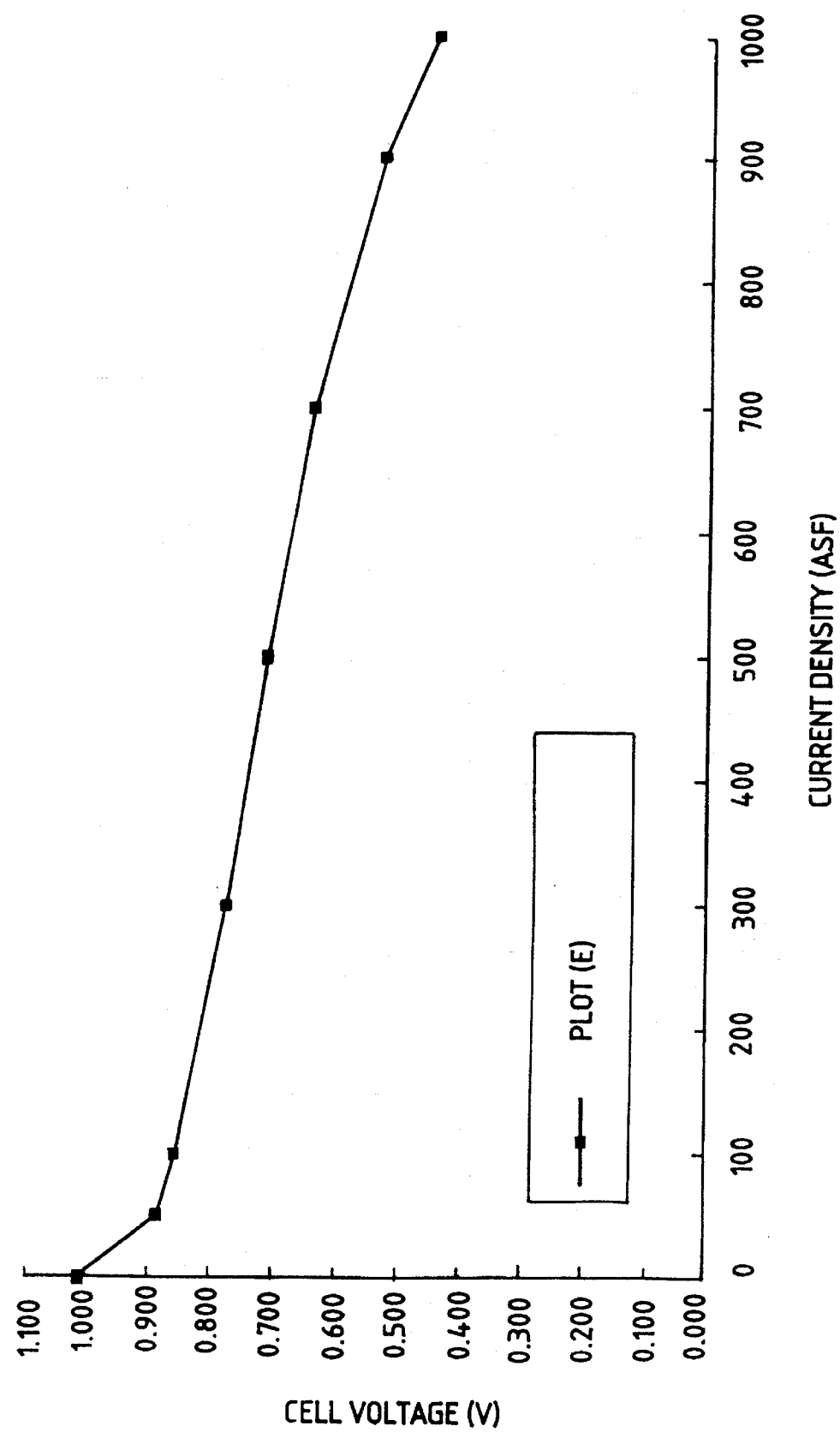
FIG. 10 is a plot of cell voltage as a function of current density for a fuel cell (designated "E") at 30/30 psig (air/$H_2$). The plot of FIG. 10 shows the performance of a fuel cell employing both embossed fluid flow field plates and an embossed coolant flow field plate.

In order to minimize cell weight and volume, the electrochemical fuel cell of the present invention preferably employs both embossed reactant fluid flow field plates and embossed coolant flow field plates. FIG. 10 is a plot of cell voltage as a function of current density for a fuel cell (designated "E") at 30/30 psig (air/$H_2$). A 2-pass anode flow field plate was employed, along with the following operating conditions: 2.0/1.5 air/$H_2$ stoichiometry, temperature =75° C., Dow experimental cation exchange membrane. FIG. 10 shows the favorable performance achieved by a fuel cell employing both embossed reactant fluid flow field plates and embossed coolant flow field plates, as well as the operability of the embossed reactant and coolant flow field plates in conjunction with the Dow experimental cation exchange membrane.

While particular elements, embodiments, and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method of fabricating an embossed separator plate for use in conjunction with an electrochemical cell, said method comprising:

providing two sheets of compressible, electrically conductive sheet material, each of said sheets having two oppositely facing major surfaces;

interposing a metal sheet between each of said compressible sheets;

embossing at least one open-faced channel in at least one of the major surfaces of said compressible sheets facing away from said metal sheet.

2. The method of claim 1 further comprising:

forming a fluid inlet on at least one of the embossed major surfaces such that said at least one channel extends from said fluid inlet, whereby said at least one channel conducts pressurized fluid introduced at said fluid inlet.

3. The method of claim 1 wherein said at least one embossed channel circumscribes the central portion of said embossed major surfaces and accommodates a substantially fluid impermeable sealant material in said at least one embossed channel, whereby said sealant material fluidly isolates said central portion from the atmosphere surrounding said plate.

4. The method of claim 3 further comprising:

forming a fluid inlet on at least one of the embossed major surfaces;

forming at least one open-faced fluid channel in said at least one embossed major surface, said at least one fluid channel extending from said fluid inlet, whereby said at least one fluid channel conducts pressurized fluid introduced at said fluid inlet.

5. The method of claim 4 wherein said at least one fluid channel is embossed in said at least one embossed major surface.

6. The method of claim 4 wherein said at least one fluid channel is milled in said at least one embossed major surface.

7. The method of claim 4 wherein said at least one fluid channel is die-cut in said at least one embossed major surface.

8. The method of claim 1 wherein each of said two compressible sheets comprises graphite foil.

* * * * *